2,772,187

PORCELAIN ENAMELING

Joseph M. Katz, Brooklyn, N. Y., and Erwin Hurst, Highland Park, and Arthur Jakubczak, Fords, N. J., assignors to General Ceramics Corporation, Keasbey, N. J., a corporation of Delaware No Drawing. Application June 2, 1954,
Serial No. 434,066

2 Claims. (Cl. 117—129)

This invention relates to an improved process for porcelain enameling of metal products and to an improved porcelain enamel slip.

In the production of enameled surfaces an enamel slip is ordinarily applied to the surface to be enameled and subsequently dried and fired. The presence of air in the slip composition gives rise to shiners and/or blebs. Shiners may be microscopic or macroscopic in size. Blebs are due to popped air bubbles and are ordinarily microscopic in size. Both shiners and/or blebs extend to the bare metal.

Many times porcelain enamels are applied by spraying and in processes where the enamel slip is sprayed, the slips are not de-aired since the very nature of the spraying process incorporates air into the slip.

Among the objects of this invention is to provide an enamel slip composition which does not develop shiners and/or blebs when applied to and fired on a metal surface.

In the production of enameled products it has also been found necessary to remove all finger marks from the surface to which the enamel slip is to be applied. Otherwise, the applied enamel slip may run off or not coat the portions containing finger marks.

Among other objects of the invention is to provide an enamel slip composition which is not sensitive to finger marks or other handling marks. Although it is still necessary to remove cutting and drawing oils, grease, scale, etc., from the metal surface to be enameled. In other words according to the present invention "run-off" due to finger prints is prevented by treating the enamel slip instead of by treating the surface to be coated.

One phase of this invention is based on the discovery that the addition of oxgall to porcelain enamel slips eliminates or reduces those defects in fired enameled surfaces such as are caused by air bubbles, finger marks, etc.

It is believed that the elimination of these defects is due to the fact that the oxgall addition reduces the surface tension of the enamel although such an explanation indicates that the oxgall possesses rather unexpected properties. To eliminate run-off due to finger marks the oxgall must be active in water at ordinary temperatures but to eliminate air blebs, etc., it appears that the oxgall must be active at a somewhat higher temperature.

The oxgall which is added is ox bile extract which consists primarily of the sodium salt of glycocholic and taurocholic acids. The term oxgall will be understood to mean either the sodium glycocholate or sodium taurocholate or similar alkali metal salts or mixture of such compounds. A sufficient amount of oxgall to achieve the results desired is approximately 0.25–1% by weight, based on the wet weight of the slip. Obviously the amount can be increased, if desired. It is immaterial how the slip is applied, i. e., the slip may be applied by spraying, brushing, dipping or any other method. The invention is especially applicable to the roller application of enamel slips as set forth in U. S. application Serial No. 438,446, filed June 22, 1954.

The invention both as to its organization and its method of operation together with additional objects and advantages thereof will best be understood from the following description of specific embodiments thereof.

Example

A ground coat enamel of the following composition is provided:

| | Percent |
|---|---|
| Silica | 50 |
| Aluminum oxide | 26 |
| Lithium oxide | 5 |
| Potassium oxide | 5 |
| Sodium oxide | 5 |
| Sodium fluoride | 8 |
| Cobalt oxide | 1 |

This composition is suspended in water or in a mixture of water and isopropyl alcohol and 0.25% based on the total weight of the slip, of oxgall is added. The oxgall is added just prior to the time of applying the slip since oxgall appears to accelerate the fermentation of the slip.

Iron or steel structures to be enameled are first cleaned of scale and grease, are then coated with the slip by spraying and fired. The fired bodies show almost no shiners or blebs and have no bare spaces due to run off caused by finger marks.

The addition has been made to many types of enamel slips and the improved results are noted in each case. Porcelain enamels may be described broadly as comprising a finely ground glass frit, a suspending agent which may be enameler's clay, for example, some organic agent such as methyl cellulose, or some inorganic agent such as bentonite and the suspending medium which is usually water. The suspending agent is not always essential. A mixture of isopropyl alcohol and water may be employed as suspending agent and suspending medium.

The features and principles underlying the invention described above in connection with specific exemplifications will suggest to those skilled in the art many other modifications thereof. It is accordingly desired that the appended claims shall not be limited to any specific feature or details thereof.

We claim:

1. In the process of enameling metal surfaces the steps comprising providing a porcelain enamel slip comprising water as a suspending medium, adding oxgall to the slip, applying a thin layer of the slip to a cleaned metal surface to be enameled and drying and firing said coated product whereby to produce a porcelain enameled metal which is substantially free from the defects of run-off, shiners and blabs.

2. In the process of enameling metal surfaces the steps comprising providing a porcelain enamel slip comprising water as the suspending medium, adding approximately 0.25 to 1% of oxgall to the slip applying a thin layer of the slip to a cleaned metal surface to be enameled and drying and firing said coated product whereby to produce a porcelain enameled metal which is substantially free from the defects of run-off shiners and blabs.

References Cited in the file of this patent

Spurrier, Journal Am. Ceram. Soc. 5 (1932), pp. 937–8.